(12) United States Patent
Liu et al.

(10) Patent No.: US 8,782,532 B2
(45) Date of Patent: Jul. 15, 2014

(54) WEBSITE OBJECT-REQUEST METHOD AND SYSTEM

(75) Inventors: Bojin Liu, Davis, CA (US); Lorenzo Vicisano, Berkeley, CA (US); Behrooz Khorashadi, Mountian View, CA (US); Saumitra M. Das, San Jose, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 198 days.

(21) Appl. No.: 13/157,397

(22) Filed: Jun. 10, 2011
(Under 37 CFR 1.47)

(65) Prior Publication Data
US 2012/0317496 A1  Dec. 13, 2012

(51) Int. Cl.
*G06F 3/048* (2013.01)
*G06F 7/00* (2006.01)

(52) U.S. Cl.
USPC .......................................... 715/748; 707/716

(58) Field of Classification Search
USPC ...................... 715/735, 748; 707/716; 716/47
See application file for complete search history.

(56) References Cited

U.S. PATENT DOCUMENTS

| | | | |
|---|---|---|---|
| 6,563,517 B1 * | 5/2003 | Bhagwat et al. | 715/735 |
| 2007/0208711 A1 * | 9/2007 | Rhoads et al. | 707/3 |
| 2008/0222244 A1 * | 9/2008 | Huang et al. | 709/203 |
| 2010/0070448 A1 * | 3/2010 | Omoigui | 706/47 |
| 2010/0158980 A1 * | 6/2010 | Kopczynski et al. | 424/426 |
| 2012/0158980 A9 | 6/2012 | Itoh et al. | |

* cited by examiner

*Primary Examiner* — Hung T Vy
(74) *Attorney, Agent, or Firm* — Neugeboren O'Dowd PC

(57) ABSTRACT

A mobile computing device adapted to request to receive a plurality of objects comprising a website in a new order, the new order being different than an original order, wherein, at least a portion of the original order comprises an order provided from a base level website object. The new order for requesting to receive the plurality of objects is based on at least one of a plurality of metrics. The metrics comprise a depth of each of the plurality of objects, one or more children of the plurality of objects, an object type for each of the plurality of objects, whether a connection has been established with a domain servicing each of the plurality of objects, and when the connection was last established to the domain servicing each of the plurality of objects.

10 Claims, 8 Drawing Sheets

US 8,782,532 B2

WEBSITE OBJECT-REQUEST METHOD AND SYSTEM

FIELD OF THE INVENTION

The present invention relates to receiving website content. In particular, but not by way of limitation, the present invention relates to requesting website objects from a mobile computing device in an order adapted to decrease the time it takes to render the webpage at the mobile computing device.

BACKGROUND OF THE INVENTION

In computing, parsing is the process of analyzing software code and building a representation of the code. Due to low power processors and insufficient memory storage on mobile devices, many mobile computing devices have poor parsing performance. Web browsing performance may then often suffer on mobile computing devices as the devices may be unable to quickly parse the objects comprising the website. Additionally, high Round Trip Time (RTT) in many mobile computing device cellular networks further impose time overhead for each object fetched. Furthermore, there is a high time-cost associated in creating new TCP connections to fetch objects at various domains.

Web browsing performance on mobile computing devices also suffers from the fact that many web pages have complicated structures, potentially comprising several hundred objects of multiple types, with some objects leading to the requirement of fetching additional objects. Objects may also be located on more than 20 domains, which is greater than maximum number of TCP connections from a typical mobile computing device. Therefore, a great amount of time is spent receiving the objects from various domains. Additionally, though there may be a large number of domains, the majority of objects may reside on only a few of these domains, so many TCP connections may need to be established for receiving only a small overall percentage of the total number of objects in the web page. Therefore, mobile computing devices may not have the ability to create concurrent TCP connections to each domain.

SUMMARY OF THE INVENTION

Due to the poor web browsing performance on many mobile computing devices, a better connection management system has been developed. Such a connection management system may exploit the known structure of a web page in order to optimize the fetching of objects comprising the webpage in order to create a better web browsing experience and decrease the time required to render a desired website.

One embodiment of the invention comprises a mobile computing device adapted to request to receive a plurality of objects comprising a website in a new order. The new order of requesting to receive the plurality of objects is different than an original order. At least a portion of the original order may be received from a base level website object. A portion of the original order may also be found in additional website objects. The new order for requesting to receive the plurality of objects may be based on at least one of, a depth of one or more of the plurality of objects, one or more children of the plurality of objects, an object type of one or more of the plurality of objects, a total number of domains servicing the plurality of objects, whether a connection has been established with a domain servicing one or more of the plurality of objects, and when the connection was last established to the domain servicing one or more of the plurality of objects.

Another embodiment of the invention comprises a mobile computing system comprising a mobile computing device, a website host device, a plurality of website object hosting devices, and a proxy device. The website host device comprises a device hosting a website having at least one base-level website object. The at least one base-level website object may reference a plurality of additional objects comprising the website. Each of the plurality of website object hosting devices comprises at least one domain and hosts at least one of the plurality of additional objects. The proxy device is adapted to provide one or more metrics, the one or more metrics comprising a depth of one or more of the plurality of additional objects, a number of children of one or more of the plurality of additional objects, an object type for one or more of the plurality of additional objects, whether a connection has been established with the plurality of website object hosting devices servicing one or more of the plurality of additional objects, and when a connection was last established to the plurality of website object hosting devices servicing one or more of the plurality of additional objects.

And another embodiment of the invention may be characterized as a method of requesting a plurality of objects comprising a file. One method comprises determining a dependency of the plurality of objects on any other of the plurality of objects. The method further comprises determining one or more metrics for the plurality of objects, the one or more metric comprising a depth of one or more of the plurality of objects, at least one of—a number of children for one or more of the plurality of objects, and the total aggregate file size of the children for one or more of the plurality of objects. Furthermore, an object type of one or more of the plurality of objects is determined as well as whether a connection is currently established to a domain hosting one or more of the plurality of objects and when the connection was last established to the domain servicing the one or more of the plurality of objects. Thereupon the method comprises requesting the plurality of objects in an order adapted to render the file. However, the order of requesting the plurality of objects is based on the dependency of each of the plurality of objects on any other of the plurality of objects and the one or more metrics.

Yet another embodiment of the invention may be characterized as a non-transitory, tangible computer readable storage medium, encoded with processor readable instructions to perform a method of requesting to receive a plurality of website objects. One method comprises requesting to view a website comprising the plurality of website objects, wherein one of the plurality of objects comprises a base-level website object. The method further comprises receiving the base-level website object and receiving information about one or more of the plurality of website objects. The information about one or more of the plurality of website objects may comprise one or more of—a dependency of each of the plurality of objects on any other of the plurality of objects, a depth of each of the plurality of objects, a number of children for each of the plurality of objects, an object type for each of the plurality of objects, whether a connection has been established with a domain servicing each of the plurality of objects, and when the connection was last established to the domain servicing each of the plurality of objects. The method may then comprise requesting to receive the plurality of website objects in an order based on the information about the one or more of the plurality of objects.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, where like or similar elements are designated with identical reference numerals throughout the several views and wherein:

DETAILED DESCRIPTION

Figure 1:
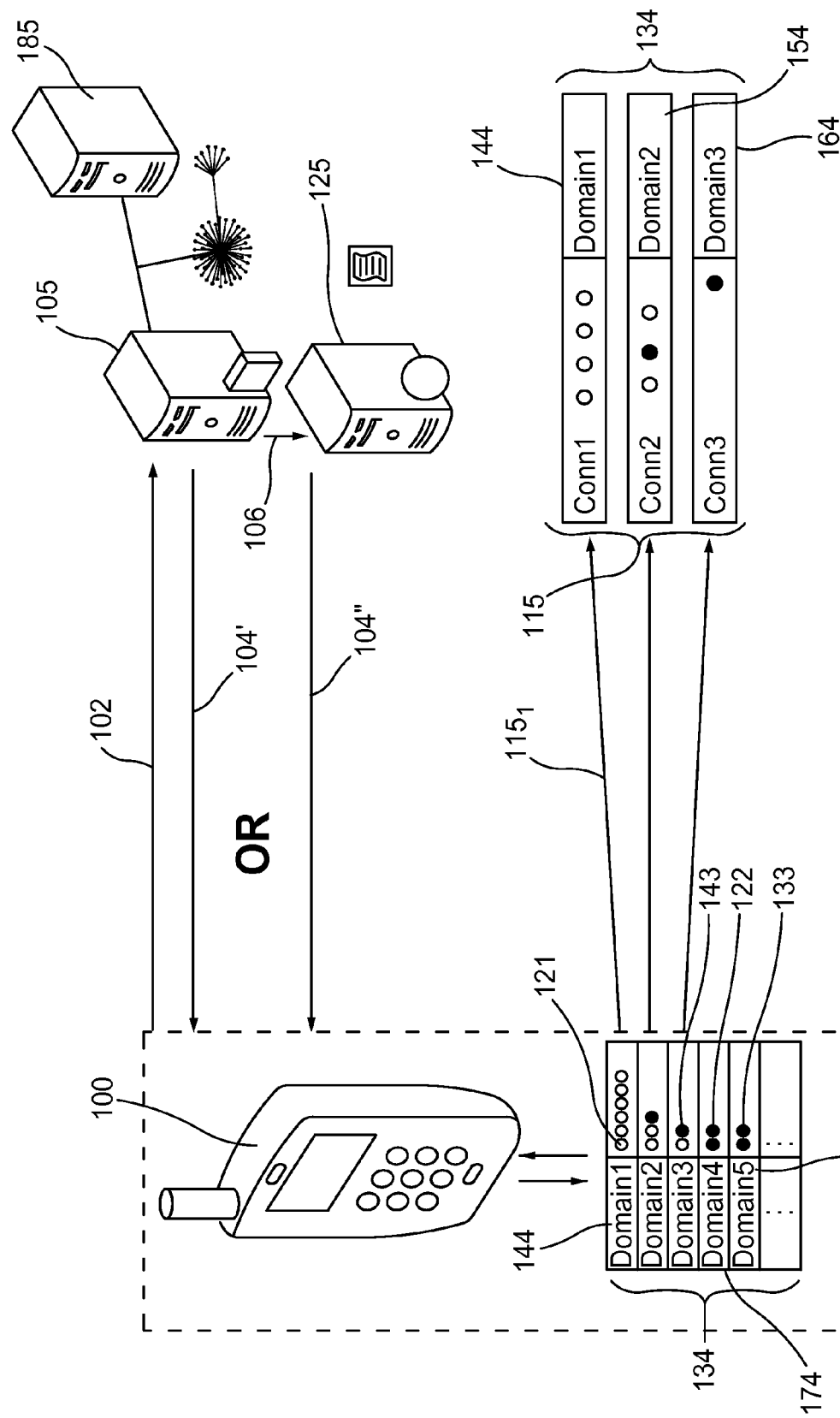
FIG. 1 illustrates a representation of communication between a mobile computing device and a website host, a proxy device, and a plurality of domains according to an exemplary embodiment of the present invention.
Figure 2:
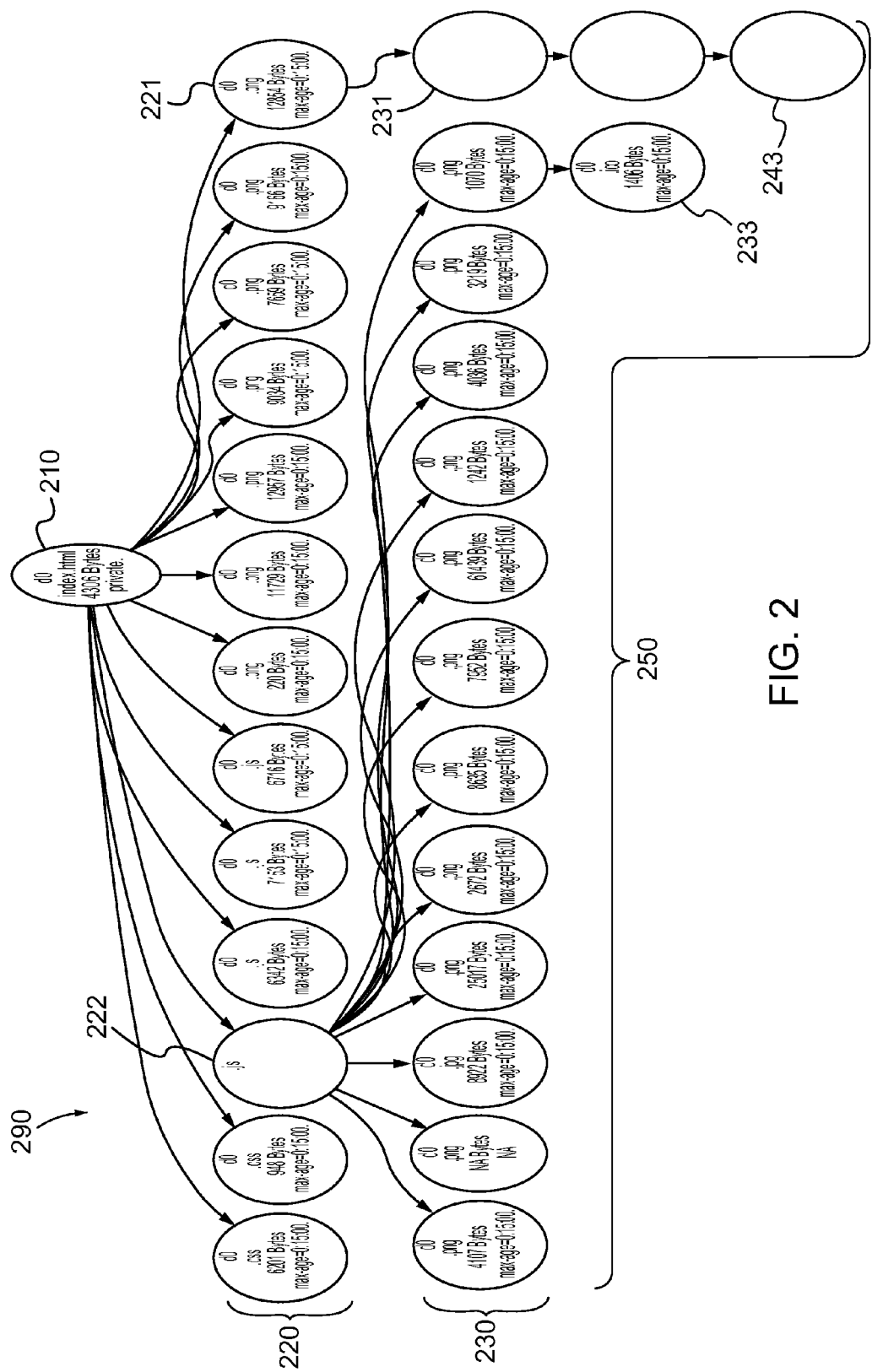
FIG. 2 illustrates a representation of a dependency graph of an exemplary embodiment of the invention.

Referring first to FIG. 1, shown are communications involving a mobile computing device 100. In one embodiment, the mobile computing device 100 is adapted to send a request 102 to receive a plurality of objects comprising a website to a website host 105. For example, the request 102 may comprise a request 102 sent from a web browser to view a website hosted on the website host 105. In response to the request 102, the website host 105 may provide the mobile computing device 100 a base-level website object. Seen in FIG. 2 is one base-level object 210. The base-level object 210 may comprise an HTML file providing the general parameters, or structure of the website. Other base-level object 210 types may comprise a javascript or php object type. In one embodiment, the FIG. 2 base-level object 210 may comprise an index.html file It is contemplated that upon receiving the base-level object 210 from the website host 105, the web browser may request to receive additional objects that may be referenced in the base-level object 210. The objects referenced in the base-level object 210 may comprise first-level objects 220. Likewise, upon receiving the first-level objects 220, the web browser may encounter further objects embedded in one or more first-level objects 220 and may subsequently request these objects. For example a first first-level object 221 seen in FIG. 2 may comprise a JavaScript object that may reference a first second-level object 231, and upon executing the JavaScript, the web browser may receive the first second-level object 231. In a typical device, the plurality of objects 250 referenced in the base-level object 210 or any other object may be requested by the mobile computing device 100 in the order in which the object is encountered by the mobile computing device 100. Such an order of requesting the plurality of objects 250 may comprise an original order.

It is contemplated that the mobile computing device 100 may establish one or more connections 115 to a domain 134 comprising one or more domains and request the plurality of objects 250 in a new order that is different from the original order. It is contemplated, that the term "the plurality of objects 250" may refer to any additional objects in the website reference by the base-level object 210 or any other object. As seen in FIG. 2, a webpage may contain many inter-dependent objects. Many of these objects may be served from different domains. For example, it is contemplated that the website host 105 may comprise a first domain adapted to serve the base-level object 210, but that one or more of the plurality of objects 250 may be served from one or more second domains such as, but not limited to, domain1 144, domain2 154, and domain3 164. In one embodiment, the new order for requesting to receive the plurality of objects 250 may be based on one or more features, or metrics, of the objects. The one or more metrics may comprise an object depth, a number and file size of any object children, an object type, the total number of domains 134 servicing the plurality of objects 250, whether a connection has been established with the domain 134 servicing an object, and when the connection was last established to the domain 134 servicing an object. Although the term "metrics" is used throughout the application, it is contemplated that "one or more metrics" or "metric information" may be used in its place, where appropriate. The mobile computing device 100 may generate the metric information, or another device may do so. Furthermore, it is contemplated that the metric information may be generated by the mobile computing device 100 or other device over a period of time.

In order to determine the new order based on the one or more metrics, in one embodiment, a dependency graph may be created. One dependency graph comprises the dependency graph 290 seen in FIG. 2, which may be a file that discloses the dependency of each of the plurality of objects 250 of a website on any other of the plurality of objects 250, among other information. Some objects may be dependent upon multiple objects. Upon creation of the dependency graph 290, the dependency graph 290 may be analyzed to obtain the object metrics. A new dependency graph 290 may then be created which comprises the metrics. Or, the metrics may be placed in the original dependency graph. It is contemplated that when referring to the dependency graph 290, the plurality of objects 250 may be referred to as "nodes." For example, upon analyzing the dependency graph 290, the metrics may be associated with each node. The mobile computing device 100 may be adapted to determine the new order for requesting to receive the plurality of objects 250 based on the dependency graph 290 and one or more metrics. The mobile computing device 100 may also receive a the new order from a network device such as, but not limited to, one of a metrics server 185 which may comprise a dedicated metrics server, proxy network device 125, and website host 105, which may also be referred to as a web host device.

As seen in FIG. 1, the metrics may be provided to the mobile computing device 100 through a metrics response 104' from one or more network devices such as, but not limited to, the website host 105. Or, the metrics may be provided from the metrics server 185 network device that may be communicatively coupled to the website host 105. The mobile computing device 100 may establish an additional connection with the website host 105 or with the metrics server 185 and the metrics response 104' may be provided through the additional connection. Alternatively, the proxy network device 125 may provide the metrics to the mobile computing device 100 through the metrics response 104". One or more of the network devices may be adapted to provide the one or more metrics to the mobile computing device 100 through a first file and a second file, wherein the first file may comprise at least one of the plurality of objects (such as, but not limited to, the base-level object) and a second file comprising the one or more metrics and the dependency graph. The mobile computing device 100 may receive the first file before receiving the second file.

The proxy network device 125, the website host 105, or the metrics server 185 may be adapted to one or more of create, analyze, and/or subsequently amend the dependency graph 290 with one more of the metrics. The proxy network device 125, which may also be referred to as a proxy device, may also receive 106 the base-level object 210 from the website host 105 and annotate the base-level object 210 with the metrics, providing the base-level object 210, metrics, and even the dependency graph 290 to the mobile computing device 100 in a single file the metrics response 104". Additional files are also contemplated in various scenarios.

However the metrics are provided to the mobile computing device 100, in one embodiment, the mobile computing device 100 may use the metrics and the dependency graph 290 information to create the new order for the web browser to request the plurality of objects 250. For example, each of the metrics may be used as a variable in an algorithm to determine the new order of requesting the plurality of objects 250. Each variable value may be weighted in the algorithm according to is proximate value in determining the order of requesting the plurality of objects 250. For example, a depth value may be weighted with a "0.1", but a number of children value may be weighted with a "0.25". It is also contemplated that other devices besides the mobile computing device 100 may develop the new order, and that any reference to a mobile computing device 100 in that capacity or any other similar capacity herein may be inferred to apply to any other device—such as, but not limited to, the proxy device, the website host 105, and the metrics server 185.

Figure 3:
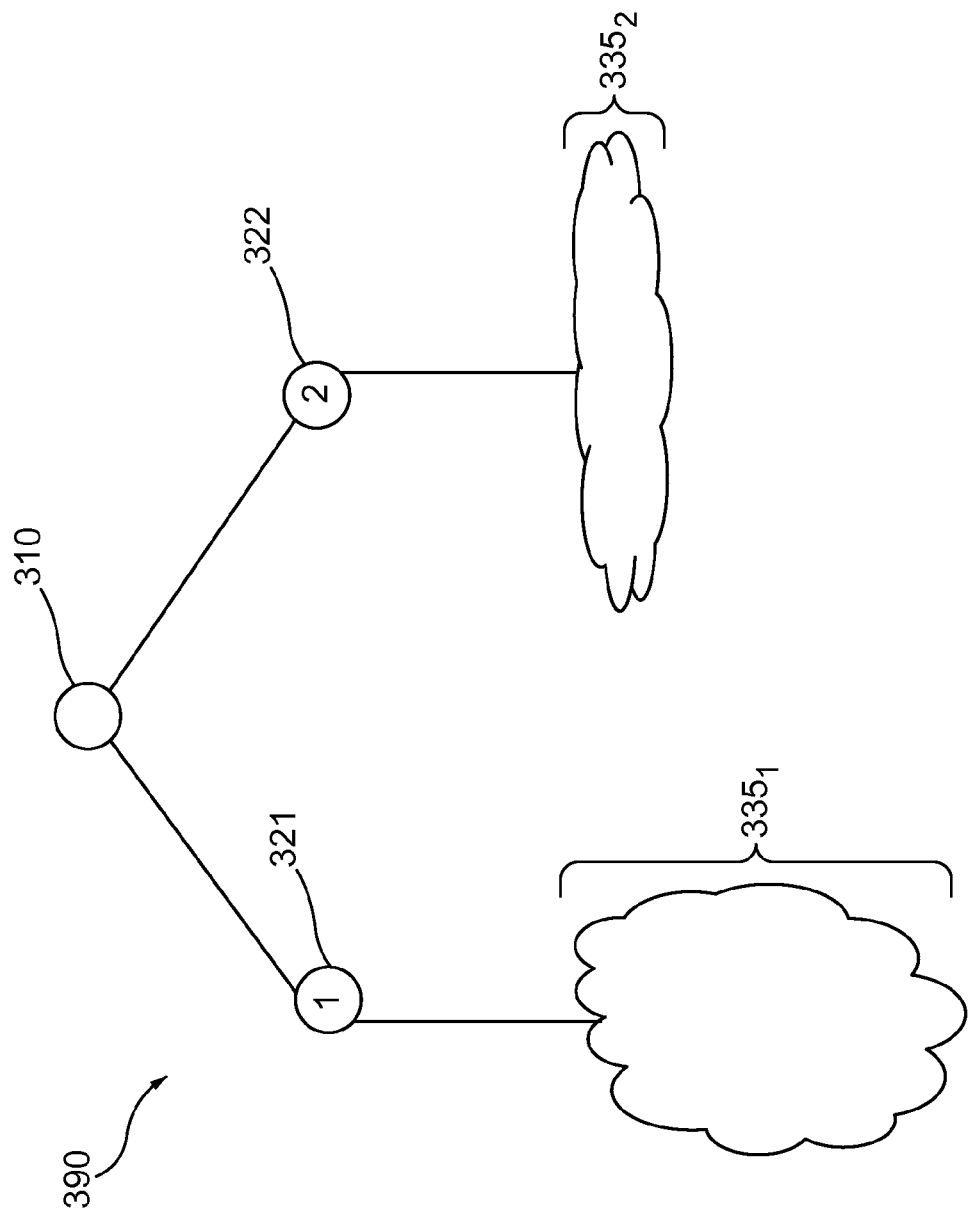
FIG. 3 illustrates a representation of a simplified dependency graph showing the depth of a pair of first-level objects of an exemplary embodiment of the invention.

Seen in FIG. 3 is one example of how a mobile computing device 100 may use the depth of a node in the dependency graph 290 of FIG. 2 to determine what order the object corresponding to the node will be requested from the mobile computing device 100. For example, in the simplified FIG. 3 dependency graph 390, shown is the base-level object 310, the first first-level object 321, and a second first-level object 322, which may correspond to the second first-level object 222 seen in FIG. 2. The mobile computing device 100 may associate a value to a depth $335_1$ of the first first-level object 321. One value of the depth $335_1$ of the first first-level object 321 may comprise a "3", which may correspond to the number of nodes in the longest path to all children nodes, as seen in the three children dependent on the first first-level object 221 of FIG. 2. Likewise, the value of the depth $335_2$ of the second first-level object 322 may comprise a "2," which may correspond to the number of nodes in the longest path to all children nodes, as seen in the children dependent on the second first-level object 222 of FIG. 2. Therefore, since the first first-level object 321 has a greater depth value than the second first-level object 322, the mobile computing device 100 may request the first first-level object 321 before the second first-level object 322 in the new order.

Figure 4:
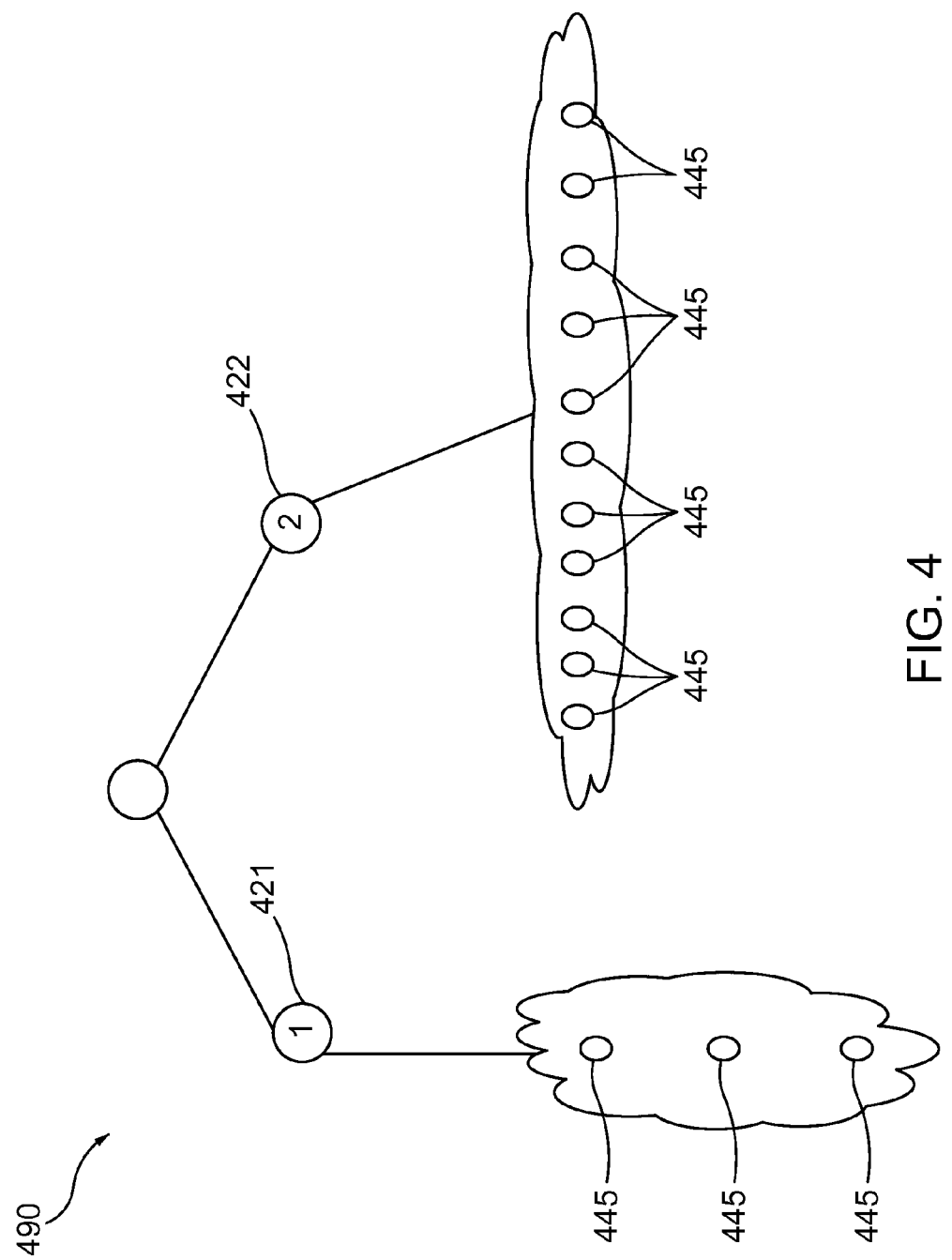
FIG. 4 illustrates a representation of a simplified dependency graph showing the children of a pair of first-level objects of an exemplary embodiment of the invention.

Turning now to FIG. 4, seen is a simplified dependency graph 490 similar to the dependency graph 390 of FIG. 3. The FIG. 4 dependency graph 490 comprises the first first-level object 421 and the second first-level object 422. The first first-level object 421 has three children 445 dependent upon the first first-level object 421, while there are eleven children dependent upon the second first-level object 422. In one embodiment, the children 445 comprise one or more objects dependent upon at least one of the plurality of objects 250. Additionally, a first children metric comprising a value corresponding to the number of first first-level object 421 children may comprise a value of "3" while the first children metric variable corresponding to the number of second first-level object 422 variable may be assigned a value of "11." Furthermore, a mobile computing device 100 may be more likely to request the second first-level object 422 before the first first-level object in the new order since requesting the second first-level object 422 will lead to fetching more children than the requesting the first first-level object 421.

A second children metric may be included in the determination of the new order of requesting the plurality of objects 250. Such a metric may be included in the first children metric variable corresponding to the number of children or may comprise a separate children metric variable. One second children metric comprises total aggregate file size of the children 445. In FIG. 4, the three children dependent on the first first-level object 421 may comprise a file size of 30 kb, 60 kb, and 15 kb, respectively, for a total aggregate file size of 105 kb. The eleven children dependent upon the second first-level object 422 may comprise a file size of 1 kb, 3 kb, 5 kb, 4 kb, 8 kb, 14 kb, 3 kb, 7 kb, 2 kb, 3 kb, and 11 kb, respectively, for a total aggregate file size of 61 kb. The mobile computing device 100 may therefore be more likely to request to receive the first first-level object 421 in the new order before the second first-level object 422 since the total aggregate file size of the children 445 of the first first-level object 421 is greater than the total aggregate file size of the children 445 of the second first-level object 422, and therefore fetching the first-first level object 421 will fetch more data. A value may be assigned to each of these aggregate file sizes and used in an algorithm to determine the new order. Furthermore, the file size variable values may be combined with the number of children variable value for each object, respectively, to create a single children metric value. In such a single children metric, more weight may be given to the number of children for a each object than the total file size for all children or vice versa. Furthermore, it is contemplated that the number of children for each object may be evaluated before determining the total file size for all children.

Figure 5:
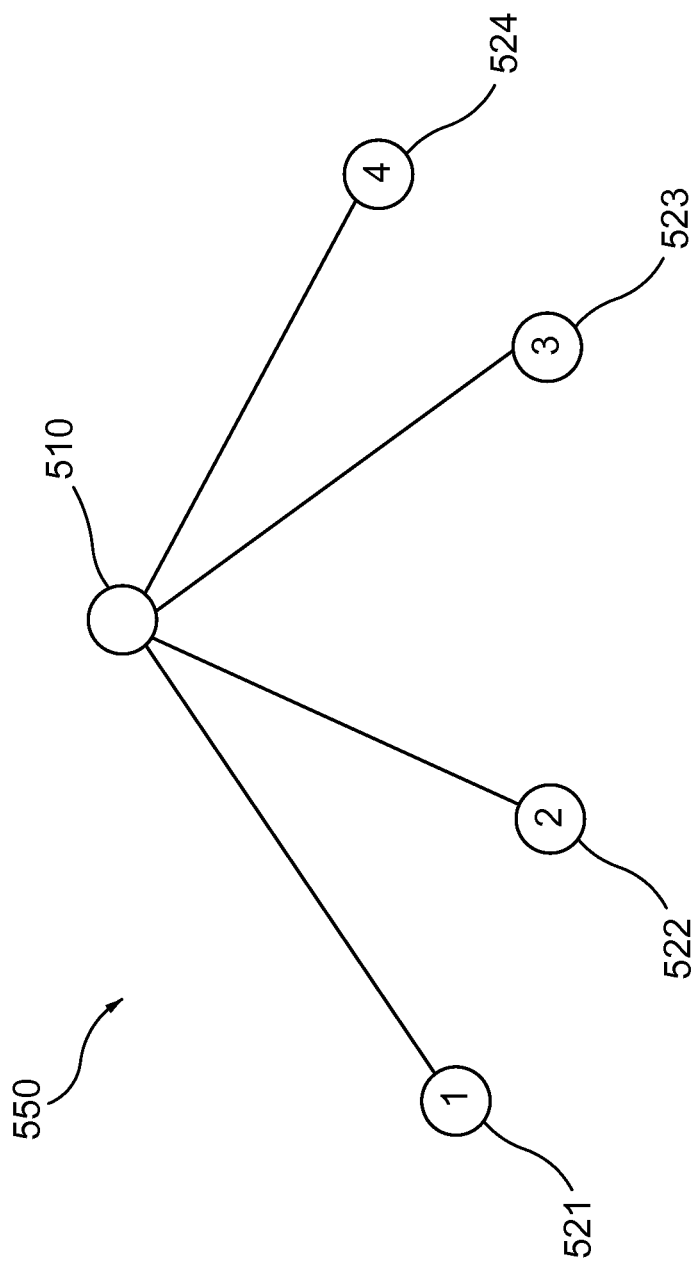
FIG. 5 illustrates a representation of a simplified dependency graph showing the object type of four first-level objects of an exemplary embodiment of the invention.

Turning now to FIG. 5, we see another simplified dependency graph 590. The FIG. 5 dependency graph 590 comprises four first-level objects which are dependent upon the base-level object 510. It is contemplated that the object type of each of the plurality of objects 250 may be used to help determine the new order of fetching the plurality of objects 250. For example, objects that may result in more children requests than other objects may receive a higher request order priority. In FIG. 5 the first first-level object 521 may comprise a HTML object, the second first-level object 522 may comprise a Java Script, the third first-level object 523 may comprise a cascading style sheet (CSS), and the fourth first-level object 524 may comprise an image. In such an embodiment, the first first-level object 521 would likely be assigned the highest priority and the second first-level object 522 may be assigned the second highest priority as it may be more likely for the HTML file to reference more children than the Java Script. Similarly, although the third first-level object 523 may be assigned a lower order than the second first-level object 522, it may be assigned a higher order than the fourth first-level object 524 since a CSS may be likely to comprise less objects than the Java Script, but more objects than an image, which may comprise the lowest priority in one embodiment. Generally, objects comprising scripts will have a higher request priority than non-script objects.

Since only a limited number of TCP connections may be established with a mobile computing device 100, the use of such TCP connections may be adjusted in connection with the request for the plurality of objects 250. For example, as seen in FIG. 1, the mobile computing device 100 may determine which domain 134 services each of the plurality of objects 250. The mobile computing device 100 may then establish a first TCP connection $115_1$ with the one or more domains servicing the greatest number of objects. For example, the mobile computing device 100 may determine that a first domain comprising Domain1 144 may service five objects including the first first-level object 121. Upon establishing the first TCP connection $115_1$ with Domain1 144, the mobile computing device 100 may increase the priority of the objects serviced by Domain1 144. Therefore, if, as seen in FIG. 1, the second first-level object 122 is serviced by a domain 134 comprising Domain4 174, and no TCP connection 115 is currently established with Domain4 174, but a TCP connection 115 is established with Domain1 144, the mobile computing device 100 may assign a higher priority to the first first-level object 121, since a TCP connection 115 is already established with the first first-level object 121.

Figure 8:
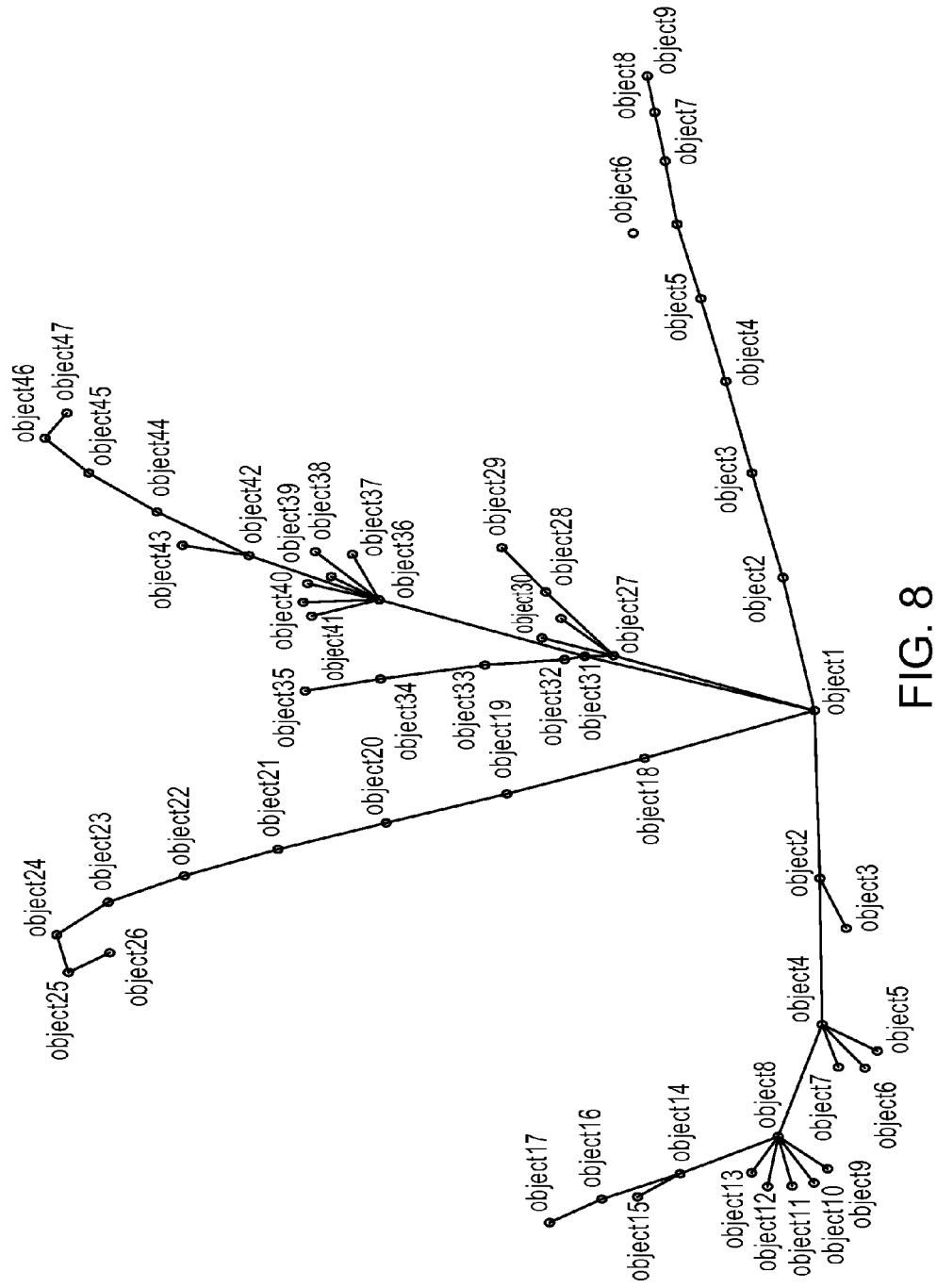
FIG. 8 illustrates the "tails" of objects of a website of an exemplary embodiment of the invention.

TCP connections 115 should also be established periodically for domains 134 servicing objects that are "on the tail" of a long string of objects. Seen in FIG. 8 are various "tails" of one website. For example, if a first fourth-level object 143, 243 is serviced by Domain3 164 and a first third-level object 133, 233 is serviced by Domain5 184, and Domain5 has been serviced by a TCP connection 115 more recently than Domain3 154, the mobile computing device 100 may establish a TCP connection to the less recently serviced domain 134, Domain3 164, and request the first fourth-level object 143, 243, before the first third-level object 133, 233. Establishing one or more TCP connection 115 with a domain 134 comprising one or more domains to receive one or more objects "on the tail" may occur in-parallel with establishing one or more TCP connections with "head" domains 134 in the same string.

Figure 6:
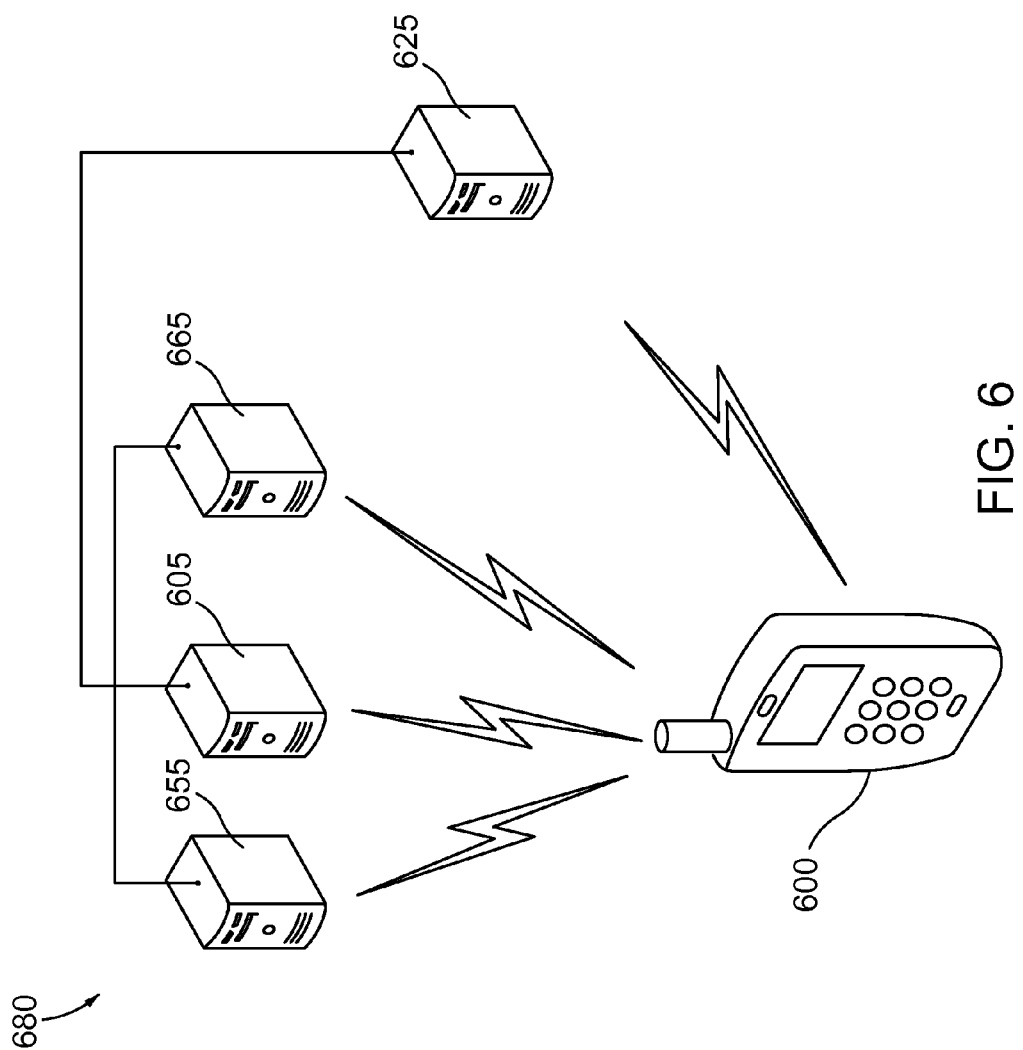
FIG. 6 illustrates a mobile computing system of an exemplary embodiment of the invention.

Turning now to FIG. 6, seen is a mobile computing system 680. One mobile computing system comprises the mobile computing device 600, the website host 605, a plurality of website object host devices 655, and a proxy device 625. The website host 605 is adapted to host a website having at least one base-level website object such as, but not limited to, the base-level object 210 seen in FIG. 2. The base-level object 210 may also reference a plurality of additional objects—such as, but not limited to, at least a portion of the plurality of objects 250. Each of the plurality of website object host devices 655 comprise at least one domain 134, and host at least one of the plurality of objects 250 comprising one or more additional objects. The proxy device 625 may be adapted to provide the one or more metrics. For example, the proxy device 625 may be operated by a third party and may comprise a third-party application provider. If the mobile computing device user has signed up for service, the proxy device 625 may be informed of the request 102 to view a website and may provide the mobile computing device 600 with the dependency graph 290, the metrics, and/or the new order.

No matter which device develops the new order for the mobile computing device 100 to request and/or receive the plurality of objects 250, any such new order for requesting and/or receiving any website objects based on the metrics may comprise requesting a first object (such as, but not limited to, the first first-level object 321 seen in FIG. 3) comprising a greater number of objects in a longest path to a child of the first object before requesting a second object (such as, but not limited to, the second first-level object 322 seen in FIG. 3) comprising a lesser number of objects in the longest path to a child of the second object. As explained above, instead of implementing a requirement of requesting of an object before another object based on the "depth" 335 of an object or any other metric described herein, an algorithm may be implemented which takes into account each metric for each object in determining the new order. Also in the new order, a first object (such as, but not limited to, the second first-level object 422 seen in FIG. 4) comprising a greater number of objects dependent upon the first object may be requested before a second object (such as, but not limited to, the first first-level object 421 seen in FIG. 4) comprising a lesser number of objects dependent upon the second object.

Additionally, at least one first object comprising a script object type may be requested before a second object comprising a non-script object type. Furthermore, a first object comprising an object serviced by a domain having a connection established to the domain may be requested before a second object comprising an object serviced by a domain not having a connection established to the domain. Also, an object serviced by a domain having a less-recently established connection may be requested in the new order (or, have a greater weight to be requested in the algorithm establishing the new order) before a second object comprising an object serviced by a domain having a more-recently established connection.

The system 680 may further comprise a first connection established between the mobile computing device 600 and the website host 605, wherein the at least one base-level website object may be provided to the mobile computing device 600 from the website host 605 across the first connection. The system 680 may also include a second connection established between the mobile computing device 600 and the proxy device 625. One or more metrics may be provided to the mobile computing device 600 from a first proxy device across the second connection.

Figure 7:
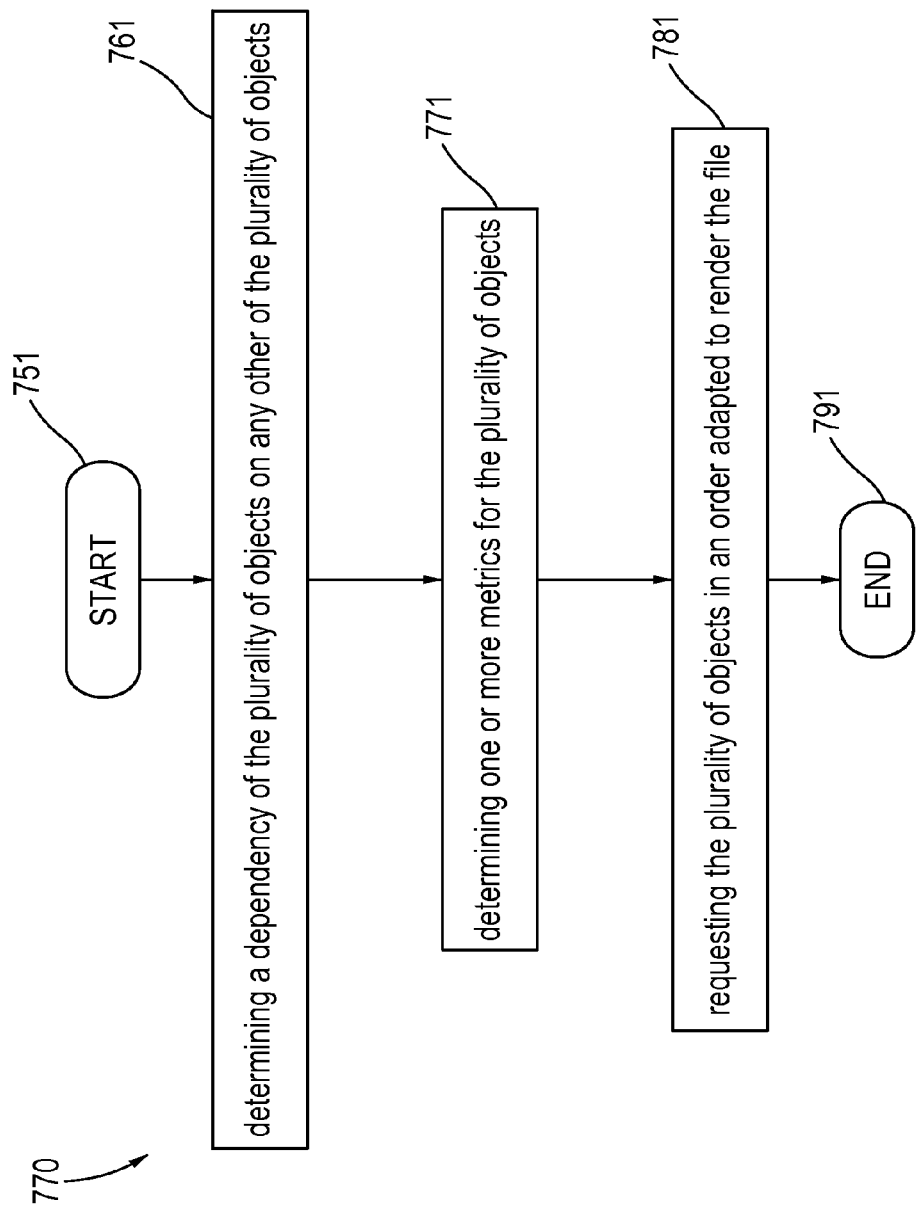
FIG. 7 is a flowchart that depicts a method that may be carried out in connection with the embodiments described herein.

Turning now to FIG. 7, seen is a method 770 of requesting a plurality of objects comprising a file. In one embodiment, the method 770 starts at 751 and at 761 comprises determining a dependency of the plurality of objects on any other of the plurality of objects. For example, this may include creating the dependency graph 290 and plurality of objects 250 seen in FIG. 2. At 771 the method 770 comprises determining one or more metrics for the plurality of objects 250, while at 781 the method 770 comprises requesting the plurality of objects 250 in an order adapted to render the file. The order of requesting the plurality of objects 250 may be based on the dependency graph 290 and the metrics. The method ends at 791.

The method 770 may further comprise setting a first TCP connection timeout for a first connection servicing a domain 134 having a first number of the plurality of objects 250 and setting a second TCP connection timeout for a second connection servicing a domain 134 having a second number of the plurality of objects 250. The first connection and first domain are different than the second connection and second domain. Furthermore, the first number of the plurality of objects 250 is greater than the second number of the plurality of objects 250. In one method 770, the first TCP connection timeout is longer than the second TCP connection timeout. Additionally, the file requested in the method 770 may comprise a website. At least one object of the plurality of objects 250 may comprise one or more first children and one or more of the first children may comprise one or more second children. The method 770 may comprise establishing a first connection with a first domain comprising a domain of the one or more domains servicing at least one of the one or more first children in parallel with establishing a second connection with a second domain comprising a domain 134 of the one or more domains servicing at least one of the one or more second children, the first domain being different than the second domain.

In one embodiment, requesting the plurality of objects in an order adapted to render the file comprises placing a first object comprising a greater number of objects in the longest path before a second object comprising a lesser number of objects in the longest path, placing a first object comprising a greater number of objects dependent upon the first object before a second object comprising a lesser number of objects dependent upon the second object, placing a first object comprising a script object type before a second object comprising a non-script object type, placing a first object comprising an object serviced by a domain having a connection established to the domain before a second object comprising an object serviced by a domain not having a connection established to the domain, and placing a first object comprising an object serviced by a domain having a less-recently established connection before a second object comprising an object serviced by a domain having a more-recently established connection.

The mobile computing device 100 may comprise a non-transitory, tangible computer readable storage medium, encoded with processor readable instructions to perform a method of requesting to receive a plurality of website objects, such as, but not limited to, the plurality of objects 250 seen in FIG. 2. One method comprises requesting to view a website comprising the plurality of website objects, wherein one of the plurality of objects comprising a base-level website object such as, but not limited to, the base-level object 210 seen in FIG. 2. The method may comprise receiving the base-level object 210 and receiving information about one or more of the plurality of objects 250 which may comprise website objects. The information may comprise information contained in the dependency graph such as, but not limited to, a dependency of each of the plurality of objects on any other of the plurality of objects. The information may further comprise receiving one or more metrics and requesting to receive the plurality of website objects in an order based on the information about the one or more of the plurality of objects. Other methods are contemplated.

In conclusion, embodiments of the present invention enable a mobile communicating device to render a website more quickly than prior art mobile computing devices. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A mobile computing device adapted to submit one or more requests to receive a plurality of objects comprising a website in a new order, the new order being different than an original order wherein,
  at least a portion of the original order comprises an order provided from a base level website object;
  the new order comprises requesting to receive,
    a first of the plurality of objects before a second of the plurality of objects,
    a third of the plurality of objects before a fourth of the plurality of objects,
    a fifth of the plurality of objects before a sixth of the plurality of objects,
    a seventh of the plurality of objects before an eighth of the plurality of objects, and
    a ninth of the plurality of objects before a tenth of the plurality of objects;
  the number of objects in a longest path from the first of the plurality of objects to a child of the first of the plurality of objects is greater than the number of objects in a longest path from the second of the plurality of objects to a child of the second of the plurality of objects;
  the number of objects dependent upon the third object is greater than the number of objects dependent upon the fourth object;
  the fifth object comprising a script object type;
  the sixth object comprising a non-script object type;
  the seventh object comprises an object serviced by a first domain having a connection currently established to the domain from the mobile computing device;
  the eighth object comprising an object serviced by a second domain not having a connection currently established to the second domain from the mobile computing device;
  the ninth object comprises an object serviced by a third domain;
  the tenth object comprises an object serviced by a fourth domain;
  a connection from the mobile computing device to the fourth domain was established more recently than a connection from the mobile computing device to the third domain; and
  the new order is based on one or more metrics, the one or more metrics comprising,
    a depth of the plurality of objects, the depth of the plurality of objects comprising a number of objects each of the plurality of objects is dependent upon;
    a number and a file size of children of the plurality of objects, wherein,
      the number of children comprise the number of objects dependent upon each of the plurality of objects,
      the file size of the children comprise an aggregate file size of the children;
    an object type of one or more of the plurality of objects;
    a total number of domains servicing the plurality of objects;
    whether a connection has been established with a domain servicing one or more of the plurality of objects; and
    when the connection was last established to the domain servicing one or more of the plurality of objects.

2. The mobile computing device of claim 1 wherein,
the base level website object provides a website structure;
the mobile computing device comprises a web browser;
the web browser is adapted to request the plurality of objects in the new order; and
the new order for requesting the plurality of objects is further based on a dependency of each of the plurality of objects on any other of the plurality of objects.

3. The mobile computing device of claim 1 wherein,
the one or more metrics are received from one or more network devices;
the one or more network devices are adapted to provide the one or more metrics to the mobile computing device through one of,
  a first file comprising at least one of the plurality of objects, and a second file comprising,
    the one or more metrics, and
    a dependency graph comprising the dependency of each of the plurality of objects on any other of the plurality of objects; and
  a single file comprising,
    at least one of the plurality of objects,
    the one or more metrics, and
    the dependency graph.

4. The mobile computing device of claim 3 wherein,
the one or more metrics are received from the one or more network devices by the first file and the second file; and
the mobile computing device receives the first file before receiving the second file.

5. A method of requesting a plurality of objects comprising a file comprising,
determining a dependency of the plurality of objects on any other of the plurality of objects;
determining one or more metrics for the plurality of objects, the one or more metrics comprising,
a depth of one or more of the plurality of objects;
at least one of,
an aggregate number of children for one or more of the plurality of objects, and
a total aggregate file size of the children for one or more of the plurality of objects;
an object type of one or more of the plurality of objects;
whether one or more connections are currently established to one or more domains hosting one or more of the plurality of objects;
when the one or more connections were last established to the one or more domains servicing each of the plurality of objects;
setting a first TCP connection timeout for a first connection of the one or more connections servicing a first domain of the one or more domains;
setting a second TCP connection timeout for a second connection of the one or more connections servicing a second domain of the one or more domains, wherein,
the second connection is different than the first connection,
the first domain services a first portion of the plurality of objects,
the second domain services a second portion of the plurality of objects,
the second portion of the plurality of objects is less than the first portion of the plurality of objects, and
the first TCP connection timeout is longer than the second TCP connection timeout; and
requesting the plurality of objects in an order adapted to render the file, wherein the order of requesting the plurality of objects is based on,
the dependency of each of the plurality of object on any other of the plurality of objects, and
the one or more metrics.

6. The method of claim 5 wherein,
the file comprises a website;
at least one object of the plurality of objects comprises one or more first children, at least one of the one or more first children having one or more second children; and further comprising,
establishing a first connection with a domain servicing at least one of the one or more first children in parallel with establishing a second connection with a domain servicing at least one of the one or more second children.

7. A non-transitory, tangible computer readable storage medium, encoded with processor readable instructions to perform a method of requesting to receive a plurality of objects comprising a file, wherein the file comprises a website, the method comprising,
determining a dependency of the plurality of objects on any other of the plurality of objects, wherein,
at least one object of the plurality of objects comprises one or more first children,
at least one of the one or more first children comprises one or more second children;
determining one or more metrics for the plurality of objects, the one or more metrics comprising,
a depth of one or more of the plurality of objects;
at least one of,
an aggregate number of children for one or more of the plurality of objects, and
a total aggregate file size of the children for one or more of the plurality of objects;
an object type of one or more of the plurality of objects;
whether one or more connections are currently established to one or more domains hosting one or more of the plurality of objects;
when the one or more connections were last established to the one or more domains servicing each of the plurality of objects;
setting a first TCP connection timeout for a first connection of the one or more connections servicing a first domain of the one or more domains;
setting a second TCP connection timeout for a second connection of the one or more connections servicing a second domain of the one or more domains, wherein,
the second connection is different than the first connection,
the first domain services a first portion of the plurality of objects,
the second domain services a second portion of the plurality of objects,
the second portion of the plurality of objects is less than the first portion of the plurality of objects, and
the first TCP connection timeout is longer than the second TCP connection timeout;
establishing a third connection with a third domain of the one or more domains, in parallel with establishing a fourth connection with a fourth domain of the one or more domains, wherein,
the third domain services at least one of the one or more first children, and
the fourth domain services at least one of the one or more second children; and
requesting the plurality of objects in an order adapted to render the file, wherein the order of requesting the plurality of objects is based on,
the dependency of each of the plurality of object on any other of the plurality of objects, and
the one or more metrics.

8. The non-transitory, tangible computer readable storage medium of claim 7 wherein the method further comprises,
receiving a base-level website object from a first network device; and
receiving information about one or more of the plurality of objects from a second network device.

9. The non-transitory, tangible computer readable storage medium of claim 7 wherein, the base-level website object comprises at least a portion of the information about one or more of the plurality of objects.

10. The non-transitory, tangible computer-readable storage medium of claim 7 wherein, the one or more of the plurality of objects comprises a first first-level object.

* * * * *